XR 3,698,099

United States
Matsura

[15] 3,698,099
[45] Oct. 17, 1972

[54] OPHTHALMOSCOPES
[72] Inventor: Thomas T. Matsura, Tokyo, Japan
[73] Assignee: American Optical Corporation, Southbridge, Mass.
[22] Filed: Jan. 29, 1971
[21] Appl. No.: 110,858

[52] U.S. Cl..........................351/6, 350/96 B, 351/7, 351/12
[51] Int. Cl..........A61b 3/12, A61b 3/14, G02b 5/16
[58] Field of Search...............351/6, 7, 12; 350/96 B; 95/11 EM

[56] References Cited

UNITED STATES PATENTS

| | | | |
|---|---|---|---|
| 3,089,398 | 5/1963 | Wilms | 351/7 X |
| 3,091,235 | 5/1963 | Richards | 350/96 B |
| 3,019,699 | 2/1962 | Schenk | 351/12 |
| 3,199,426 | 8/1965 | Kuwahara et al. | 351/7 X |
| 3,010,357 | 11/1961 | Hirschowitz | 350/96 B |
| 3,016,000 | 1/1962 | Noyori | 351/7 X |

Primary Examiner—David Schonberg
Assistant Examiner—Paul A. Sacher
Attorney—William C. Nealon, Noble S. Williams and Robert J. Bird

[57] ABSTRACT

An instrument for selectively performing direct and photographic ophthalmoscopy including a variable focus image-forming objective at one end of an elongated flexible illuminating and image-transporting bundle of optical fibers having an image-viewing eyepiece and associated ophthalmoscopic optics adjacent its opposite end for diagnostically viewing images transported by the optical fiber bundle and a camera associated with said eyepiece for selectively photographically recording images transported by said flexible bundle of optical fibers.

6 Claims, 1 Drawing Figure

PATENTED OCT 17 1972
3,698,099
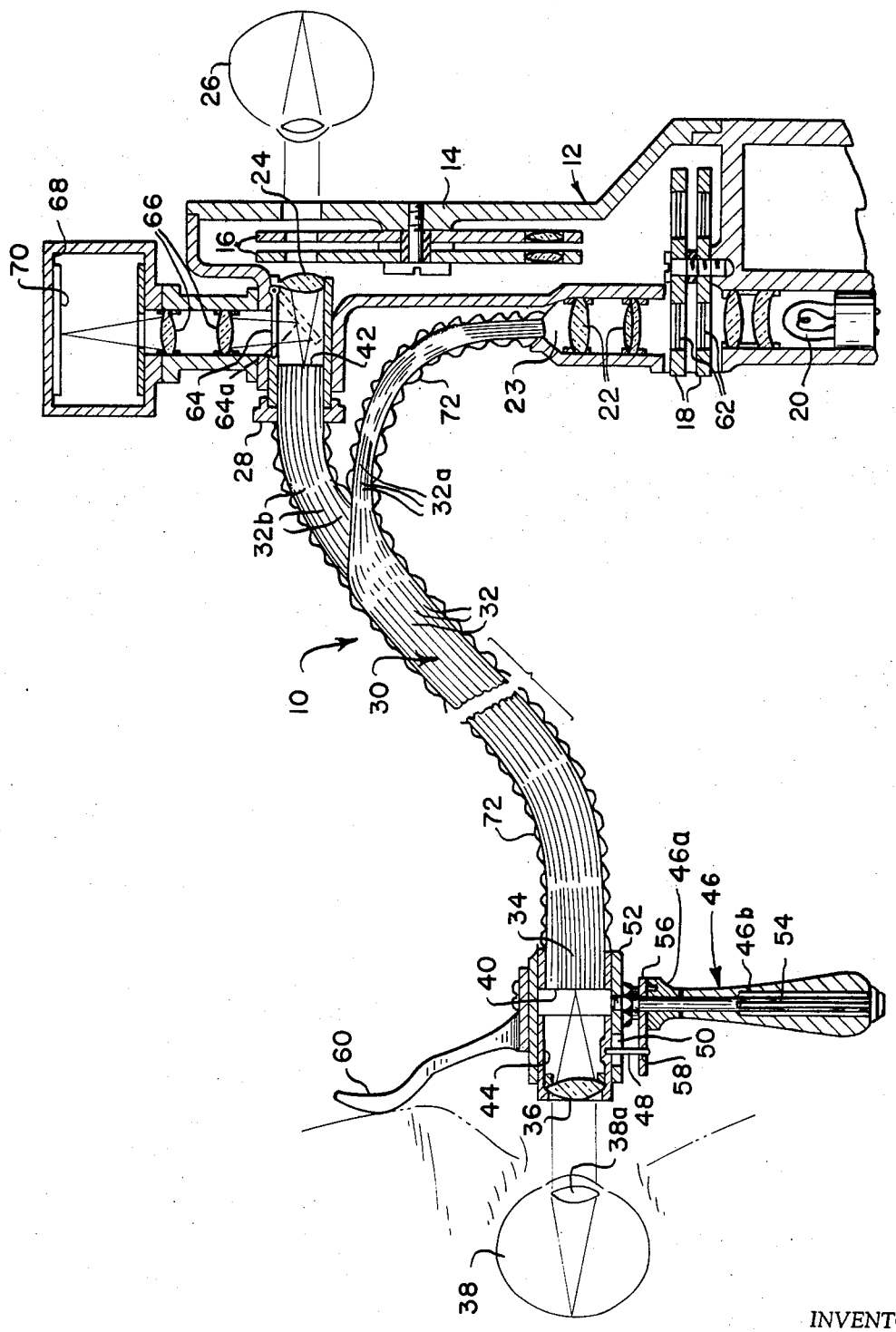
INVENTOR.
THOMAS T. MATSUURA
BY
Noble T. Williams
ATTORNEY

OPHTHALMOSCOPES

BACKGROUND OF THE INVENTION

1. Field of the Invention

Ophthalmic instruments with particular reference to improvements in an ophthalmoscope for direct and photographic ophthalmoscopy.

2. Description of the Prior Art

Direct ophthalmoscopy has, heretofore, required an uncomfortably close proximity of the eye of the practitioner to that of the patient with awkward head movements of one or both being required for viewing different parts of the eye fundus and its other components. Still further complicating the ophthalmic examination is the need for manipulation of focusing lenses during or upon assuming the various viewing positions, all of which renders this type of ophthalmic examination difficult, tedious to perform and especially problematic in dealing with patients having to maintain positions other than upright, i.e. lying on their side, back or prone.

A principal objective of the present invention is to overcome the aforementioned and related drawbacks of conventional direct and photographic ophthalmoscopy wherewith ophthalmic examinations can be performed with exceptional ease and comfort to both the patient and practitioner and with greater facility for discovery and diagnosis of ophthalmic abnormalities.

SUMMARY OF THE INVENTION

The foregoing objective and others which may become apparent hereinafter are accomplished according to the present invention with ophthalmoscopic instrumentation including an elongated, flexible illuminating and image transporting bundle of optical fibers having a variable focus image-forming objective at one end and an image-viewing eyepiece adjacent its opposite end for diagnostically viewing images received and transported by the optical fiber bundle. The image forming objective end of the optical fiber bundle, being freely maneuverable independently of and at a substantial distance from the ophthalmoscopic eyepiece, permits variable angular viewing of an eye under examination for maximum coverage of various parts of its fundus and/or external components from a fixed practitioner's viewing position.

The invention will be more fully understood by reference to the following detailed description when taken in conjunction with the accompanying drawing.

DESCRIPTION OF THE DRAWING

The FIGURE is an illustration, in cross-section, of a preferred embodiment of the invention depicting its use in ophthalmoscopy.

DESCRIPTION OF THE PREFERRED EMBODIMENTS

Referring more particularly to the drawing, it can be seen that ophthalmoscope 10 comprises a main body portion 12 having a housing 14 within which are supported the usual ophthalmoscopic multiple element rotary discs 16 and 18 carrying lenses and light filters, a light source 20 and condensing lens system 22 in channel 23.

Housing 14 may be rendered attachable to the usual ophthalmoscopic battery handle or the like in the event that it is desired to be hand-held during use. In the present case, however, housing 14 is preferably attached to an instrument stand (not shown) as a stationary unit therewith which may be rendered movable, e.g., with casters. Alternatively, it may have its own pedestal. In any case, housing 14 is provided with a practitioner's viewing aperture having eyepiece 24 placed forwardly of rotary discs 16. Eyepiece 24 includes fitting 28 into which one end of an elongated flexible bundle 30 of optical light-conducting fibers 32 is proximally fixedly secured. Adjacent to housing 14 peripheral fibers 32a of bundle 30 are separated from the more central fibers 32b of the bundle and directed into channel 23 of housing 14. Fibers 32a receive light from source 20 and conduct same to the distal end 34 of bundle 30 where it is emitted from fibers 32 through objective lens 36 for illumination of an eye 38 of a patient to be examined ophthalmoscopically.

With this light directed through objective lens 36 into eye 38 and at least partially reflected from illuminated portions of the fundus, these portions of the fundus are imaged by objective lens 36 (along with the lens 38a of eye 38) upon end face 40 of bundle 30. The image is then transported by the well known principles of total internal reflection through fibers 32b to emitting face 42 of the fiber bundle. In order to assure a focused condition of images of different parts of the eye 38 upon face 40 of bundle 30, objective lens 36, in tubular sleeve 44, is selectively adjustable toward and away from face 40 by manipulation of the upper rotatable section 46a of handle 46. Pin 48 fixedly secured in sleeve 44 extends through slot 50 in collar 52 to which handle 46 is attached by rod 54. The lower section 46b of handle 46 is splined or otherwise fixedly secured to rod 54. Plate 56 fixed to section 46a of handle 46 and having cam slot 58 into which pin 48 extends, controls the extent of movement of objective lens 36 toward and away from face 40 according to the direction and extent of rotation of section 46a. Thus, with handle 46, the distal end 34 of bundle 30 may be directed with one hand placed upon section 46b toward any particular inside or external portion of eye 38 desired to be examined and the practitioner may, with the thumb or a finger of the same hand used to rotate section 46a, simultaneously bring images of these portions of eye 38 into focus upon face 40 for viewing at face 42 of fiber bundle 30.

Headrest 60, fixed to collar 52, may be fulcrumed against a patient's brow (as illustrated) for steadying the image-receiving objective end of bundle 30 during ophthalmoscopy.

As mentioned hereinabove, images formed upon face 40 of bundle 30 are conducted by fibers 32b to face 42 for viewing through eyepiece 24 by the practitioner's eye 26. Additionally, through adjustment of discs 16, various combinations of filters and/or magnifying lenses may be included in the eyepiece system of ophthalmoscope 10 for special viewing effects. At the same time, variously selected light filters 62 in discs 18 may be placed in the path of light being directed into illuminating fibers 32 for producing additional examining effects which may facilitate discovery and diagnosis of ophthalmic abnormalities. Details concerning the use of the various lenses and/or light-filtering elements in discs 16 and 18 as well as other procedures practiced in the performance of ophthalmoscopy may be had by referring to U.S. Pat. No. 3,019,699. Also, those interested in details of the construction, function, and general principles of operation of optical light conducting fibers and fiber optical image-transporting bundles may refer to U.S. Pat. Nos. 3,033,731 and 3,091,235.

Photographic recording of images received at face 42 of fiber bundle 30 may be accomplished by lowering mirror 64 to the position shown with dotted outline 64a whereby, through camera lens system 66 and camera 68 (both illustrated diagrammatically) face 42 is imaged upon film 70. Mirror 64 may be partially transmissive to light whereby viewing of face 42 with eye 26 and simultaneous photographing thereof may be accomplished. Intensified illumination of an eye 38 under examination may be accomplished by substituting a photographic flash lamp for light source 20 and/or supplementing the light emitted from source 20 with intense stroboscopic light or the like.

Bundle 30 of optical fibers 32 may be sheathed with a flexible conventional fabric or metallic protective covering 72. The bundle may be of any desired convenient length, up to several feet, but preferably not more than an arm's length since its distal end is intended to be operated by one hand of a practitioner viewing its proximal end.

Reference made hereinabove to objective lens 36, condenser lens system 22, eyepiece 24 and camera lens system 66 is intended to include either one or a plurality of lenses in each case selected with ordinary skill in the art to fulfill their aforementioned requirements.

I claim:

1. In an ophthalmoscopic instrument having a main body portion which houses a viewing aperture, a light channel with a source of light therein and auxiliary lens and light filtering means selectively positionable in line with said viewing aperture and light channel, the improvement comprising:

an elongated flexible light-conducting fiber bundle having a first portion of its fibers proximally secured to said housing in tightly grouped together axially aligned relationship with said viewing aperture, the remaining fibers being proximally tightly grouped together and secured to said housing in aligned relationship with said light channel;

said fibers of said bundle all being distally tightly grouped together adjacent their termini as a combined light-emitting and image-receiving face of said fiber bundle with said grouped opposite ends of said first portion of fibers comprising an image-emitting face of the bundle;

objective lens means adjacent said termini of said fibers for producing images of objects under observation by said ophthalmic instrument upon said image-receiving face of said bundle for transference to said image-emitting face and viewing thereof through said viewing aperture; and protruding handle means also adjacent said fiber termini for manually manipulating said bundle and for moving said objective lens relative to said objects under observation for selectively imaging portions of said objects through said objective lens means upon said image-receiving face of said bundle.

2. The improvement in an ophthalmoscopic instrument according to claim 1 wherein said first portion of said fibers of said bundle comprises centrally disposed fibers thereof and said remaining fibers are peripherally disposed fibers of said bundle.

3. The improvement in an ophthalmoscopic instrument according to claim 1 further including an eyepiece disposed in said viewing aperture of said instrument for facilitating said viewing of said image-emitting face of said fiber bundle.

4. The improvement in an ophthalmoscopic instrument according to claim 1 further including a mirror selectively positionable in said viewing aperture for receiving image-forming light from said image-emitting face of said bundle and redirecting such light laterally away from said viewing aperture, and a camera arranged to receive and photographically record said laterally directed image-forming light.

5. The improvement in an ophthalmoscopic instrument according to claim 1 wherein said handle means includes a cam and cam-follower mechanism operatively linking said objective lens means and handle for moving said objective lens means toward and away from said image-receiving face of said bundle by rotation of said bundle.

6. The improvement in an ophthalmoscopic instrument according to claim 1 further including a brow rest attached to said fiber bundle adjacent said image-receiving face thereof for facilitating said manual manipulation of said bundle.

* * * * *